No. 796,781. PATENTED AUG. 8, 1905.
J. WELSH.
PROCESS OF REPAIRING PIPE LINES.
APPLICATION FILED APR. 1, 1905.

WITNESSES:

INVENTOR
John Welsh
BY
ATTORNEYS

UNITED STATES PATENT OFFICE.

JOHN WELSH, OF JERSEY CITY, NEW JERSEY.

PROCESS OF REPAIRING PIPE-LINES.

No. 796,781.      Specification of Letters Patent.      Patented Aug. 8, 1905.

Application filed April 1, 1905. Serial No. 253,345.

*To all whom it may concern:*

Be it known that I, JOHN WELSH, a citizen of the United States, and a resident of Jersey City, in the county of Hudson and State of New Jersey, have invented a new and Improved Process of Repairing Pipe-Lines, of which the following is a full, clear, and exact description.

This invention relates to the laying of pipe, such as water-pipe; and the object of the invention is to provide an improved process for repairing a break occurring in the pipe-line.

In repairing water-pipe lines it is found in practice that it is impossible to close off the water perfectly on either side of the point where the break has occurred, as the valves in the main are apt to have grit or sediment collect on their seats in such a manner as to prevent the valve from closing tightly. The water passing the valves in this way progresses to the point where the repair is being made and interferes very materially with the making of the permanent joints. This effect is materially increased when the joints are made with lead, which is flowed into the collars. This invention affords means for disposing of this water so that it does not interfere with the repairing operation.

Reference is to be had to the accompanying drawings, forming a part of this specification, in which similar characters of reference indicate corresponding parts in all the figures.

Figure 1 is a side elevation representing a portion of a pipe-line supposed to have been broken and illustrating the first step of the repairing process. Fig. 2 is a side elevation showing a portion of the pipe-line after being repaired; and Fig. 3 is a side elevation, partially broken away and representing a sleeve which is used in repairing pipe according to my process.

Referring more particularly to the parts, 1 represents a water-pipe line, and let it be supposed that a break has occurred at the point 2 between the valves 3. In making the repair a portion of the broken pipe-line is removed, leaving the adjacent ends 4 and 5 of the pipe nicely cut, as shown in Fig. 1. Over the right-hand portion $1^a$ a sleeve 6 is slipped, passing bodily over the pipe, so as to envelop the same, as shown. This sleeve is shown very clearly in Fig. 3. It consists of a cylindrical body 7 of enlarged diameter, having enlarged collars 8 at its extremities and having also a boss 9 substantially at its middle point. In the boss 9 a threaded opening 10 is formed, which may be closed by a plug 11. As indicated in Fig. 1, the sleeve is applied with the opening 10 disposed downwardly in such a manner that the opening would operate as a drain for water within the sleeve. After applying the sleeve as indicated in Fig. 1 a pipe connection 12 is employed, the same having a collar 13, which is applied at the pipe end 4, a joint being made at this point in the usual manner. The length of the pipe connection 12 is not sufficient to completely bridge the space between the pipe ends 4 and 5, so that a gap 14 is left at this point, as illustrated in Fig. 2. After the pipe connection 12 is placed as described the sleeve 6 is slid over the adjacent extremity thereof, as indicated in Fig. 2, and this sleeve is then permanently fixed at this point in the usual manner by means of lead, which is flowed into the collars 8, as will be readily understood. While the joints are being formed between the sleeve and the adjacent pipe connections, any water which may find its way along the pipe-line will pass through the drip-opening 10, and will hence not interfere with the joint-making process. After the joints at the ends of the sleeve have been separately made the opening 10 will be closed permanently by the plug 11, which will be screwed in position. The valves 3 may then be reopened and water allowed to flow again in the pipe-line.

This process evidently affords means for repairing a pipe-line so as to overcome the defects mentioned above, which tend to prevent the making of good joints.

Having thus described my invention, I claim as new and desire to secure by Letters Patent—

1. The process of repairing pipe-lines which consists in slipping an enveloping sleeve over the adjacent pipe connections to be connected, permitting the water leaking through said connections to flow through an outlet in the under side of said sleeve while making the joints at the extremities thereof and plugging said outlet thereafter.

2. A process of repairing a pipe-line which consists in connecting the adjacent ends at the break, by means of a sleeve enveloping the adjacent pipe connection, providing an outlet for water at the lower side of said sleeve, and plugging said outlet after making permanent joint connections at the ends of said sleeve.

In testimony whereof I have signed my name to this specification in the presence of two subscribing witnesses.

JOHN WELSH.

Witnesses:
 LOUIS HOEHL,
 DANIEL H. CARPENTER.